United States Patent
He et al.

(10) Patent No.: US 12,124,334 B2
(45) Date of Patent: Oct. 22, 2024

(54) METHODS AND DEVICES FOR FAILOVERS IN PROCESSING NODES FOR COLLABORATIVE COMPUTING

(71) Applicant: Tencent Technology (Shenzhen) Company Limited, Shenzhen (CN)

(72) Inventors: Junhua He, Shenzhen (CN); Baoyuan Liu, Shenzhen (CN); Xiang Zeng, Shenzhen (CN); Boping Yu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 154 days.

(21) Appl. No.: 17/743,837

(22) Filed: May 13, 2022

(65) Prior Publication Data

US 2022/0269564 A1 Aug. 25, 2022

Related U.S. Application Data

(63) Continuation of application No. PCT/CN2021/097956, filed on Jun. 2, 2021.

(30) Foreign Application Priority Data

Jul. 8, 2020 (CN) .......................... 202010652008.1

(51) Int. Cl.
*G06F 11/00* (2006.01)
*G06F 9/50* (2006.01)
(Continued)

(52) U.S. Cl.
CPC .......... *G06F 11/142* (2013.01); *G06F 9/5077* (2013.01); *G06F 11/0709* (2013.01);
(Continued)

(58) Field of Classification Search
CPC .. G06F 11/142; G06F 11/203; G06F 11/0709; G06F 9/5077; G06F 9/5088; G06F 9/4881
See application file for complete search history.

(56) References Cited

U.S. PATENT DOCUMENTS 10,089,197 B2 * 10/2018 Cheng .................... G06F 9/5027
10,990,464 B1 * 4/2021 Ping ....................... G06F 3/0604
(Continued)

FOREIGN PATENT DOCUMENTS

| CN | 102999385 A | 3/2013 |
|---|---|---|
| CN | 103324539 A | 9/2013 |

(Continued)

OTHER PUBLICATIONS

Office Action with Concise Explanation of Relevance issued in Chinese Patent Application No. 202010652008.1 dated Aug. 29, 2023, 13 pages.

(Continued)

*Primary Examiner* — Elmira Mehrmanesh
(74) *Attorney, Agent, or Firm* — Crowell & Moring LLP

(57) ABSTRACT

This application discloses a processing node management method and apparatus, a device, and a storage medium, which belongs to the field of cloud technologies and big data. The method includes: obtaining, in response to an abnormal processing node in a processing node cluster being detected, abnormal status information of the abnormal processing node; in response to the abnormal status information satisfying a condition, enabling an auxiliary node outside the processing node cluster to replace the abnormal processing node; adjusting an execution policy of the data processing task in response to the auxiliary node being enabled; distributing data processing sub-tasks to the auxiliary node and remaining processing nodes based on the execution policy; and transmitting corresponding task execution instructions (Continued)

to the auxiliary node and the remaining processing nodes, the task execution instructions being used for instructing the auxiliary node and the remaining processing nodes to perform the corresponding data processing sub-tasks.

20 Claims, 4 Drawing Sheets

(51) Int. Cl.
*G06F 11/07* (2006.01)
*G06F 11/14* (2006.01)
*G06F 11/20* (2006.01)
*H04L 41/0668* (2022.01)
*G06F 9/48* (2006.01)

(52) U.S. Cl.
CPC ........ G06F 11/203 (2013.01); H04L 41/0668 (2013.01); *G06F 9/4881* (2013.01)

(56) References Cited

U.S. PATENT DOCUMENTS

| 2005/0022202 | A1 | 1/2005 | Sannapa Reddy et al. |
| 2011/0022882 | A1* | 1/2011 | Jaehde ................ G06F 11/2035 |
| | | | 714/E11.073 |
| 2016/0173584 | A1* | 6/2016 | Fitzpatrick .......... H04L 67/1008 |
| | | | 709/223 |
| 2018/0032382 | A1* | 2/2018 | Kamawat ............ G06F 11/1484 |
| 2018/0088987 | A1* | 3/2018 | Foebel ................ G06F 11/1479 |
| 2019/0342149 | A1* | 11/2019 | Guo ..................... H04L 67/1059 |
| 2019/0342230 | A1* | 11/2019 | Hariharan ........... H04L 67/1031 |

FOREIGN PATENT DOCUMENTS

| CN | 103617086 | A | 3/2014 |
| CN | 104461752 | A | 3/2015 |
| CN | 105335251 | A | 2/2016 |
| CN | 106095570 | A | 11/2016 |
| CN | 106155770 | A | 11/2016 |
| CN | 107092522 | A | 8/2017 |
| CN | 108304255 | A | 7/2018 |
| CN | 108768729 | A | 11/2018 |
| CN | 109343939 | A | 2/2019 |
| CN | 109976883 | A | 7/2019 |
| CN | 110677282 | A | 1/2020 |
| CN | 110716827 | A | 1/2020 |
| CN | 110727508 | A | 1/2020 |
| CN | 111160810 | A | 5/2020 |
| CN | 111181774 | A | 5/2020 |
| CN | 111381972 | A | 7/2020 |
| CN | 111459642 | A | 7/2020 |
| CN | 111818159 | A | 10/2020 |

OTHER PUBLICATIONS

International Search Report and Written Opinion with English Translation for International Application No. PCT/CN2021/097956 dated Aug. 19, 2021, 13 pgs.

* cited by examiner

METHODS AND DEVICES FOR FAILOVERS IN PROCESSING NODES FOR COLLABORATIVE COMPUTING

RELATED APPLICATION

This application is a continuation application of PCT Patent Application No. PCT/CN2021/097956, filed on Jun. 2, 2021, which claims priority to Chinese Patent Application No. 202010652008.1, filed with the China National Intellectual Property Administration on Jul. 8, 2020, each of which is incorporated herein by reference in its entirety.

FIELD OF THE TECHNOLOGY

This application relates to the field of cloud computing technologies and big data, and in particular, to a processing node management technology.

BACKGROUND OF THE DISCLOSURE

Big data refers to a data set that cannot be captured, managed, and processed by using conventional software tools within a certain time period, and is massive and diversified information assets with a high growth rate, which requires new processing modes to have stronger decision-making power, insight, and process optimization capabilities.

In the related art, a computer device performs data processing on big data in a manner of parallel computing. The parallel computing refers to a process of resolving computing problems by using a variety of computing resources. The basic idea of the parallel computing is to collaboratively resolve the same problem by using a plurality of processors, that is, to divide the to-be-solved problem into several parts, where each part is computed by using an independent processor. To be specific, for a same data processing task, the computer device may allow different processing nodes to process different parts of the data processing task, so as to realize parallel computing of big data.

However, in the related art, during processing of the data processing task, if an abnormal occurs in a processing node, a corresponding data processing task cannot be completed normally, which leads to low reliability of data processing.

SUMMARY

Embodiments of this disclosure provide a processing node management method and apparatus, a device, and a non-transitory storage medium, which can improve the reliability of data processing, and ensure that a data processing task can be successfully completed. The technical solutions are as follows.

According to one aspect of the embodiments of this disclosure, a processing node management method is provided, performed by a computer device, the method including:

obtaining, in a case that it is detected that there is an abnormal processing node in a processing node cluster corresponding to a data processing task, abnormal status information of the abnormal processing node, the processing node cluster including a plurality of processing nodes, the plurality of processing nodes being configured to collaboratively perform the data processing task;

determining, in a case that the abnormal status information satisfies a condition, to enable an auxiliary node outside the processing node cluster to replace the abnormal processing node;

adjusting an execution policy of the data processing task in a case that it is determined that the auxiliary node is enabled, the execution policy being used for indicating a processing manner of the data processing task;

determining data processing sub-tasks respectively corresponding to the auxiliary node and remaining processing nodes based on the execution policy, the remaining processing nodes being processing nodes other than the abnormal processing node in the processing node cluster; and transmitting corresponding task execution instructions to the auxiliary node and the remaining processing nodes, the task execution instructions being used for instructing the auxiliary node and the remaining processing nodes to perform the corresponding data processing sub-tasks.

According to one aspect of the embodiments of this disclosure, a processing node configuration method is provided, performed by a computer device, the method including:

obtaining a data processing task;

determining task information corresponding to the data processing task, the task information being related information about a data processing situation during performing of the data processing task; and configuring a processing node cluster and auxiliary nodes outside the processing node cluster for the data processing task according to the task information, the processing node cluster including a plurality of processing nodes, the plurality of processing nodes being configured to collaboratively perform the data processing task, and the auxiliary node being configured to perform, in a case that there is an abnormal processing node in the processing node cluster, the task in replace of the abnormal processing node.

According to one aspect of the embodiments of this disclosure, a processing node management apparatus is provided, disposed on a computer device, the apparatus including:

an information obtaining module, configured to obtain, in a case that it is detected that there is an abnormal processing node in a processing node cluster corresponding to a data processing task, abnormal status information of the abnormal processing node, the processing node cluster including a plurality of processing nodes, the plurality of processing nodes being configured to collaboratively perform the data processing task;

a node enabling module, configured to determine, in a case that the abnormal status information satisfies a condition, to enable an auxiliary node outside the processing node cluster to replace the abnormal processing node;

a policy adjustment module, configured to adjust an execution policy of the data processing task in a case that it is determined that the auxiliary node is enabled, the execution policy being used for indicating a processing manner of the data processing task;

a task determination module, configured to determine data processing sub-tasks respectively corresponding to the auxiliary node and remaining processing nodes based on the execution policy, the remaining processing nodes being processing nodes other than the abnormal processing node in the processing node cluster; and an instruction transmission module, configured to transmit corresponding task execution instructions to the auxiliary node and the remaining processing nodes, the task execution instructions being used for instructing the auxiliary node and the remaining processing nodes to perform the corresponding data processing sub-tasks.

According to one aspect of the embodiments of this disclosure, a processing node configuration apparatus is provided, disposed on a computer device, the apparatus including:

a task obtaining module, configured to obtain a data processing task;

an information determination module, configured to determine task information corresponding to the data processing task, the task information being related information about a data processing situation during performing of the data processing task; and a node configuration module, configured to configure a processing node cluster and auxiliary nodes outside the processing node cluster for the data processing task according to the task information, the processing node cluster including a plurality of processing nodes, the plurality of processing nodes being configured to collaboratively perform the data processing task, and the auxiliary node being configured to perform, in a case that there is an abnormal processing node in the processing node cluster, the task in replace of the abnormal processing node.

According to one aspect of the embodiments of this disclosure, a computer device is provided, including a processor and a memory, the memory storing at least one instruction, at least one segment of program, a code set or an instruction set, the at least one instruction, the at least one segment of program, the code set or the instruction set being loaded and executed by the processor to implement the foregoing processing node management method or the foregoing processing node configuration method.

According to one aspect of the embodiments of this disclosure, a non-transitory computer-readable storage medium is provided, including at least one instruction, at least one segment of program, a code set or an instruction set, the at least one instruction, the at least one segment of program, the code set or the instruction set being loaded and executed by a processor to implement the foregoing processing node management method or the foregoing processing node configuration method.

According to one aspect of the embodiments of this disclosure, a computer program product or a computer program is provided. The computer program product or the computer program includes computer instructions, and the computer instructions are stored in a non-transitory computer-readable storage medium. A processor of a computer device reads the computer instructions from the non-transitory computer-readable storage medium, and executes the computer instructions to cause the computer device to perform the foregoing processing node management method or the foregoing processing node configuration method.

The technical solutions provided in the embodiments of this disclosure may bring the following beneficial effects:

In a case that it is detected that there is an abnormal processing node in a processing node cluster corresponding to a data processing task, abnormal status information of the abnormal processing node is obtained. An execution policy of the data processing task is adjusted in a case that it is determined according to the abnormal status information that an auxiliary node is enabled, and data processing sub-tasks respectively corresponding to the auxiliary node and remaining processing nodes are determined again, the remaining processing nodes being processing nodes other than the abnormal processing node in the processing node cluster. In this way, the abnormal processing node is replaced by the auxiliary node, so that the auxiliary node and the remaining processing nodes collaboratively perform the data processing task, avoiding a failure of the data processing task caused by a processing node abnormal, thereby improving the reliability of data processing, and ensuring that the data processing task can be successfully completed. Moreover, low data processing efficiency caused by unreasonable allocation of the data processing task may be avoided in this method, which is beneficial to improve the data processing efficiency of each node, thereby ensuring the processing efficiency of the entire data processing task.

BRIEF DESCRIPTION OF THE DRAWINGS

To describe the technical solutions of the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from these accompanying drawings without creative efforts.

DESCRIPTION OF EMBODIMENTS

To make the objectives, technical solutions, and advantages of this application clearer, the following further describes implementations of this application in detail with reference to the accompanying drawings.

Figure 1:
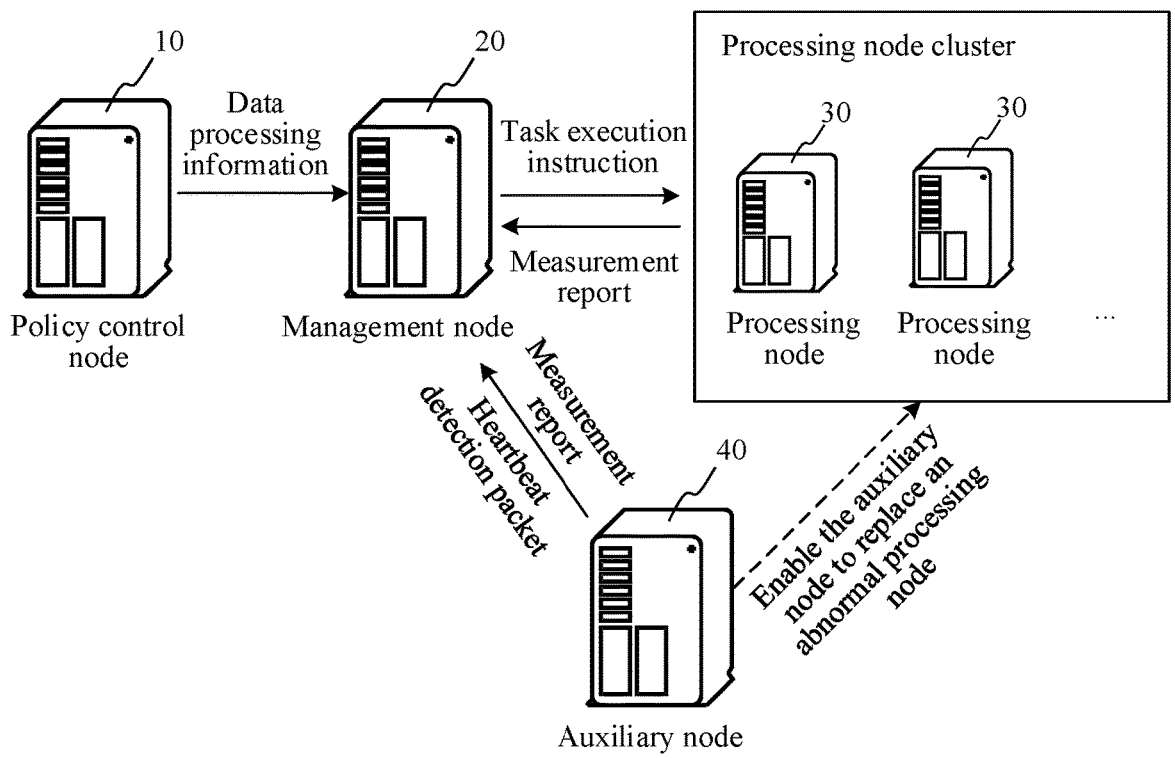
FIG. 1 is a schematic diagram of a data processing system according to an embodiment of this disclosure.

FIG. 1 is a schematic diagram of a data processing system according to an embodiment of this disclosure. The data processing system may include a policy control node 10, a management node 20, processing nodes 30, and an auxiliary node 40.

The policy control node 10 is configured to determine quantities of management nodes 20, processing nodes 30, and auxiliary nodes 40. Generally, after obtaining a data processing task, the policy control node 10 analyzes data that needs to be processed in the data processing task, to determine task information corresponding to the data processing task. The task information refers to processing information of data during performing of the data processing task, such as a to-be-processed data volume, task processing duration, and a parallel computing acceleration ratio.

In a possible implementation, the policy control node 10 determines a quantity of processing nodes 30 according to the to-be-processed data volume and the task processing duration, and then determines a quantity of auxiliary nodes 40 according to the quantity of the processing nodes 30 and the parallel computing acceleration ratio. After that, the policy control node determines a quantity of management nodes 20 according to a management capability of the management nodes 20 to the processing nodes 30 and the quantity of the processing nodes 30. In the embodiments of this disclosure, after determining the quantities of the management nodes 20, the processing nodes 30, and the auxiliary nodes 40, the policy control node 10 transmits data processing information to the management nodes 20. The data processing information includes the foregoing data processing task and the quantities of the management nodes 20, the processing nodes 30, and the auxiliary nodes 40 that correspond to the data processing task.

The management node 20 is configured to manage the processing nodes 30 and the auxiliary nodes 40. The management node 20 may transmit task execution instructions to the processing nodes 30 and the auxiliary nodes 40, the task execution instructions being used for controlling the processing nodes 30 and the auxiliary nodes 40 to perform corresponding operations. In a possible implementation, the management node 20 controls the processing nodes 30 to perform the foregoing data processing task. For example, after receiving the data processing information, the management node 20 divides the data processing task according to a quantity of processing nodes 30, to determine a data processing sub-task corresponding to each processing node 30, and then transmits a task execution instruction to the each processing node 30, the task execution instruction being used for controlling the processing node 30 to perform a corresponding data processing sub-task.

In another possible implementation, the management node 20 controls auxiliary nodes 40 to perform the foregoing data processing task in replace of the processing nodes 30. For example, after detecting that a processing node 30 is in an abnormal status, the management node 20 obtains an abnormal reason of the processing node 30, determines a restoration time of the processing node 30 according to the abnormal reason, determines, in a case that the restoration time is greater than a threshold, to enable an auxiliary node 40 to replace the processing node 30 in the abnormal status, to collaboratively perform the data processing task with remaining processing nodes, and transmits a task execution instruction to the auxiliary node 40, the task execution instruction being used for controlling the auxiliary node 40 to perform a corresponding data processing sub-task. In the embodiments of this disclosure, the management node 20 may simultaneously enable a plurality of auxiliary nodes 40.

The processing nodes 30 are configured to perform the data processing task. In the embodiments of this disclosure, a plurality of processing nodes 30 may collaboratively process a same data processing task, and the plurality of processing nodes 30 may form a processing node cluster. A quantity of processing nodes 30 is determined by the foregoing policy control node 10. This is not limited in the embodiments of this disclosure.

In a possible implementation, after receiving a task execution instruction, a processing node 30 performs a corresponding data processing sub-task according to the task execution instruction, and periodically transmits a measurement report to the management node 20, the measurement report including task processing information and node status information. The task processing information is used for indicating a task processing progress of the processing node 30, and the node status information is used for indicating a working status of the processing node 30. Correspondingly, after receiving the measurement report, the management node 20 determines, according to the node status information in the measurement report, whether the processing node 30 is in an abnormal status.

An auxiliary node 40 is configured to perform, in a case that the processing node 30 is in an abnormal status, the data processing task in replace of the processing node 30. In the embodiments of this disclosure, after receiving the task execution instruction, the auxiliary node 40 may perform a corresponding data processing sub-task according to the task execution instruction. In a case that the auxiliary node 40 does not receive the task execution instruction, the auxiliary node periodically transmits a heartbeat detection packet to the management node 20, the heartbeat detection packet being used for representing, to the management node 20, that the auxiliary node 40 is available for allocating a task. In a case that the auxiliary node 40 receives the task execution instruction, the auxiliary node periodically transmits a measurement report to the management node, the measurement report including task processing information and node status information. The task processing information is used for indicating a task processing progress of the auxiliary node 40, and the node status information is used for indicating a working status of the auxiliary node 40.

In the embodiments of this disclosure, the data processing task may be a processing task for big data. Big data refers to a data set that cannot be captured, managed, and processed by using conventional software tools within a certain time period, and is massive and diversified information assets with a high growth rate, which requires new processing modes to have stronger decision-making power, insight, and process optimization capabilities. With the advent of a cloud era, big data draws more and more attention. For big data, special technologies are needed to effectively process a large amount of data within a required time period. The technologies applicable to big data include a massively parallel processing database, data mining, a distributed file system, a distributed database, a cloud computing platform, the Internet, and an extensible storage system.

A big data processing system in the cloud technology may be formed by using the data processing system shown in FIG. 1. The bid data processing system may include a plurality of servers. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The policy control node 10, the management node 20, the processing node 30, and the auxiliary node 40 may be disposed on different servers. This is not limited in the embodiments of this disclosure.

The policy control node 10, the management node 20, the processing node 30, and the auxiliary node 40 communicate with each other by using a network.

The technical solutions of this application are described below by using several embodiments.

Figure 2:
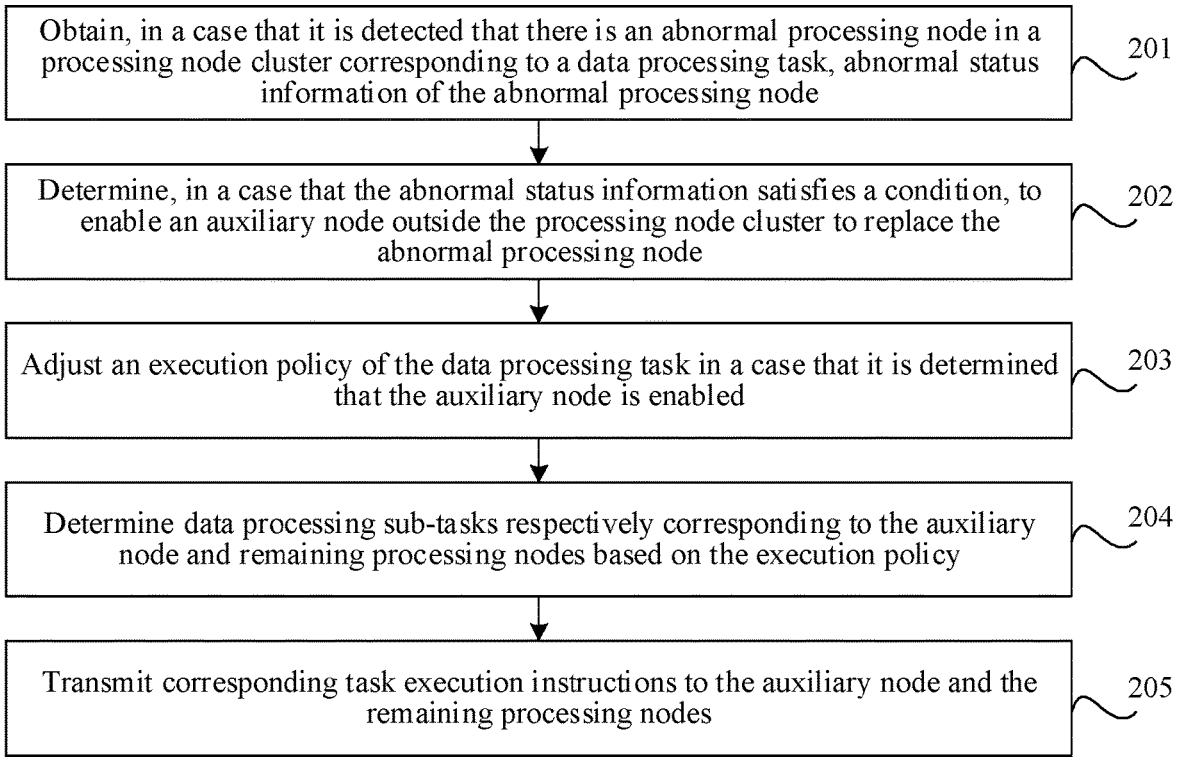
FIG. 2 is a flowchart of a processing node management method according to an embodiment of this disclosure.

FIG. 2 is a flowchart of a processing node management method according to an embodiment of this disclosure. An execution subject of each step may be a computer device, and the computer device is, for example, the management node 20 in the data processing system in FIG. 1. The method may include the following steps (step 201 to step 205):

Step 201. Obtain, in a case that it is detected that there is an abnormal processing node in a processing node cluster corresponding to a data processing task, abnormal status information of the abnormal processing node.

The data processing task refers to a task of processing a part of data, for example, performing data traversing, data storage, data conversion, and data visualization. It may be understood that the data processing task may be a task of processing data of all types, or may be a task of processing big data. This is not limited in the embodiments of this disclosure.

The processing node cluster refers to a node cluster including a plurality of processing nodes. In the embodiments of this disclosure, the plurality of processing nodes are configured to collaboratively perform the foregoing data processing task. Generally, after obtaining the data processing task, the management node may divide the data processing task according to processing nodes, to determine data processing sub-tasks corresponding to different processing nodes.

In a possible implementation, the management node divides the data processing task according to a quantity of processing nodes. For example, after obtaining the data processing task, the management node may divide the data processing task in average according to a to-be-processed data volume corresponding to the data processing task and a quantity of processing nodes, to ensure that to-be-processed data volumes of data processing sub-tasks corresponding to the processing nodes are the same, thereby ensuring balanced workloads of the processing nodes.

In another possible implementation, the management node divides the data processing task according to working capabilities of the processing nodes. For example, after obtaining the data processing task, the management node may divide the data processing task according to a to-be-processed data volume corresponding to the data processing task and data processing efficiency and/or power of the processing nodes, to determine data processing sub-tasks corresponding to the processing nodes, thereby avoiding overloading of the processing nodes.

In yet another possible implementation, the management node divides the data processing task according to work types corresponding to the processing nodes. For example, after obtaining the data processing task, the management node divides the data processing task according to a data processing type corresponding to the data processing task and work types corresponding to the processing nodes, to determine data processing sub-tasks corresponding to the processing nodes, thereby ensuring high processing efficiency of the processing nodes. An example in which the data processing task is a data conversion task is used. Assumed that the data conversion task includes conversion between data A and data B, a data conversion task from data A to data B is allocated to a first processing node, and a data conversion task from data B to data A is allocated to a second processing node.

In the embodiments of this disclosure, after determining the data processing sub-tasks corresponding to the processing nodes, the management node may generate a task list, and transmit the task list to auxiliary nodes. Correspondences between the processing nodes and the data processing sub-tasks are recorded in the task list.

The abnormal processing node refers to a processing node that is in an abnormal operating status. For example, a processing node does not work normally due to memory corruption of the processing node. The abnormal status information is used for indicating a reason why a processing node is in an abnormal working status. In the embodiments of this disclosure, in a case that it is detected that there is an abnormal processing node in a processing node cluster corresponding to a data processing task, the management node obtains abnormal status information of the abnormal processing node.

In a possible implementation, the management node may determine whether this is an abnormal in a measurement report, to determine whether a processing node is an abnormal processing node. The measurement report refers to a report used for reporting a working status and a task processing progress of a processing node to the management node. Based on this, before step 201, the following sub-steps are included.

1. Obtain a measurement report transmitted by each processing node in the processing node cluster.

The measurement report includes task processing information and node status information. The task processing information is used for indicating a task processing progress of the processing node, and the node status information is used for indicating a working status of the processing node.

In the embodiments of this disclosure, during performing of a data processing sub-task, a processing node may periodically transmit a measurement report to the management node. Correspondingly, the management node receives the measurement report, and detects a working status and a task processing progress of the processing node according to the measurement report.

2. Determine, in a case that there is an abnormal in a measurement report of a target processing node, that the target processing node is the abnormal processing node.

In a case that it is determined that there is an abnormal in a measurement report of a processing node, for example, a target processing node, the management node determines that the target processing node is the abnormal processing node. That there is an abnormal in a measurement report includes at least one of the following: there is an abnormal in task processing information included in the measurement report, there is an abnormal in node status information included in the measurement report, and the measurement report is not received within set duration.

In a possible implementation, after receiving the measurement report of the target processing node, the management node analyzes task processing information in the measurement report, determines that there is an abnormal in the task processing information, for example, a task processing progress corresponding to the task processing information is lower than an expected target value, and therefore, determines that the target processing node is the abnormal processing node.

In another possible implementation, after receiving the measurement report of the target processing node, the management node analyzes node status information in the measurement report, determines that there is an abnormal in the node status information, for example, the node status information indicates that the target processing node is in a low-rate working status, and therefore, determines that the target processing node is the abnormal processing node.

In yet another possible implementation, in a case that the measurement report of the target processing node is not received within set duration, the management node determines that there is an abnormal in the measurement report of the target processing node, and therefore, determines that the target processing node is the abnormal processing node. In a possible implementation, in a case that the measurement report of the target processing node is not received within first duration, the management node determines that there is an abnormal in the measurement report, and therefore, determines that the target processing node is the abnormal processing node. In another possible implementation, in a case that the measurement report of the target processing node is not received within the first duration, the management node transmits a report obtaining request to the target processing node, the report obtaining request being used for requesting to obtain a measurement report from the target processing node. Correspondingly, in a case that the target processing node feeds back a corresponding measurement report to the management node within second duration, the management node determines, according to the measurement report, whether the target processing node is an abnormal processing node. In a case that the target processing node does not feedback a corresponding measurement report to the management node within second duration, the management node determines that the target processing node is the abnormal processing node.

In the embodiments of this disclosure, in a case that it is determined that there is an abnormal processing node in a processing node cluster corresponding to a data processing task, the management node obtains abnormal status information of the abnormal processing node. In a possible implementation, the abnormal processing node simultaneously transmits corresponding abnormal status information while transmitting a measurement report to the management node. For example, the abnormal status information is included on the measurement report. In another possible implementation, after determining the abnormal processing node, the management node transmits a status information obtaining request to the abnormal processing node, the status information obtaining request being used for requesting to obtain abnormal status information corresponding to the abnormal processing node. Corresponding, the abnormal processing node transmits the corresponding abnormal status information to the management node according to the status information obtaining request.

Step 202. Determine, in a case that the abnormal status information satisfies a condition, to enable an auxiliary node outside the processing node cluster to replace the abnormal processing node.

The condition refers to a determination condition for determining whether to enable an auxiliary node. In the embodiments of this disclosure, after obtaining the abnormal status information of the abnormal processing node, the management node may analyze the abnormal status information, and determine, in a case that the abnormal status information satisfies a condition, to enable an auxiliary node outside the processing node cluster to replace the abnormal processing node.

In a possible implementation, after obtaining the abnormal status information, the management node determines an abnormal reason of the abnormal processing node according to the abnormal status information. The abnormal reason may be included in the abnormal status information. After obtaining the abnormal status information, the management node directly determines the abnormal reason from the abnormal status information. After obtaining the abnormal reason, the management node determines a restoration cost of the abnormal processing node according to the abnormal reason. The restoration cost refers to resources consumed by restoring the abnormal processing node, for example, a restoration time, a restoration operation difficulty, and data required for restoration. In a case that the restoration cost is greater than a threshold, it is determined that restoration (or recovery) of the abnormal processing node is less cost-effective, and an auxiliary node is enabled to replace the abnormal processing node.

In another possible implementation, the management node cannot obtain the foregoing abnormal status information. In a case that the abnormal processing node is a processing node that cannot transmit information, the management node may determine, in a case that the abnormal status information is not obtained, that the abnormal processing node cannot be restored, and determine to enable an auxiliary node to replace the abnormal processing node. For example, in a case that the abnormal processing node cannot transmit a measurement report, the management node may determine by default that the abnormal processing node cannot transmit abnormal status information, and determine to enable an auxiliary node to replace the abnormal processing node.

In the embodiments of this disclosure, after determining to enable an auxiliary node to replace the abnormal processing node, the management node may perform restoration configuration on the abnormal processing node, and replace the abnormal processing node with the auxiliary node. Optionally, after step 202, the following sub-steps are included.

1. Transmit a restoration instruction to the abnormal processing node.

The restoration instruction is used for performing restoration on the abnormal processing node. After determining to enable an auxiliary node to replace the abnormal processing node, the management node simultaneously restores the abnormal processing node in a case that the auxiliary node performs the data processing task, and transmits a restoration instruction to the abnormal processing node.

In a possible implementation, the restoration instruction may include a restoration operation used for restoring the abnormal processing node. In this way, after the abnormal reason is determined, the management node determines a restoration operation of the abnormal processing node based on the abnormal reason, generates a restoration instruction according to the restoration operation, and transmits the restoration instruction to the abnormal processing node. Correspondingly, after receiving the restoration instruction, the abnormal processing node performs restoration by itself according to the restoration operation in the restoration instruction.

In a possible implementation, the restoration operation includes restoration data. In this way, after receiving the restoration instruction, the abnormal processing node may obtain the restoration data according to the restoration instruction, and perform corresponding operations on the restoration data according to operation instructions in the restoration operation, to perform restoration by itself. In another possible implementation, to avoid a failure of restoration data transmission, the restoration instruction further includes an obtaining address and/or identification information of the restoration data. In this way, after receiving the restoration instruction, the abnormal processing node may obtain an obtaining address and/or identification information of restoration data according to the restoration instruction, obtain the restoration data according to the obtaining address and/or identification information, and then perform corresponding operations on the restoration data according to operation instructions in the restoration operation, to perform restoration by itself.

2. Determine, in a case that a restoration completion response from the abnormal processing node is received, that the abnormal processing node is restored from an abnormal status to a normal status.

The restoration completion response is used for indicating that the abnormal processing node completes self-restoration. After successfully completing self-restoration according to the restoration instruction, the abnormal processing node transmits a restoration completion response to the management node. Correspondingly, in a case that a restoration completion response from the abnormal processing node is received, the management node determines that the abnormal processing node is restored from an abnormal status to a normal status. The normal status refers to a status in which the abnormal processing node can work normally.

3. Transmit configuration information to the abnormal processing node.

The configuration information is used for configuring the abnormal processing node as the auxiliary node. In a case that it is determined that the abnormal processing node is restored to the normal status, the management node transmits configuration information to the abnormal processing node. Correspondingly, the abnormal processing node performs configuration according to the configuration information, and replaces the abnormal processing node with the auxiliary node.

It may be understood that the configuration information may include all configuration information of the auxiliary node, or may include some pieces of corresponding information that need to be re-configured, of the auxiliary node relative to the abnormal processing node. This is not limited in the embodiments of this disclosure.

4. Determine, in a case that a configuration completion response from the abnormal processing node is received, that the abnormal processing node is successfully recovered and configured as an auxiliary node.

The configuration completion response is used for indicating that the abnormal processing node completes configuration and recovers to normal condition. After completing configuration according to the configuration information, the abnormal processing node may transmit a configuration completion response to the management node. Correspondingly, in a case that a configuration completion response from the abnormal processing node is received, the management node determines that the abnormal processing node is converted to an auxiliary node.

After converted to the auxiliary node, the abnormal processing node may periodically transmit a heartbeat detection packet to the management node, the heartbeat detection packet being used for representing, to the management node, that the abnormal processing node is available for allocating a task.

After it is determined that the auxiliary node is enabled to replace the abnormal processing node, restoration configuration is performed on the abnormal processing node, and the abnormal processing node is converted to the auxiliary node. After the auxiliary node is enable, other auxiliary nodes are added to ensure that there are adequate auxiliary nodes in a processing node system.

Step 203. Adjust an execution policy of the data processing task in a case that it is determined that the auxiliary node is enabled.

The execution policy is used for indicating a processing manner of the data processing task, for example, a division manner of the data processing task, and an execution manner of the data processing task. In this embodiment, the management node may determine data processing sub-tasks respectively corresponding to the auxiliary node and remaining processing nodes according to the execution policy, the remaining processing nodes being processing nodes other than the abnormal processing node in the processing node cluster. In the embodiments of this disclosure, in a case that it is determined that the auxiliary node is enabled, the management node adjusts an execution policy of the data processing task, to ensure that the data processing task can be successfully completed.

In the embodiments of this disclosure, an execution policy adjustment count of the data processing task may be set. The execution policy adjustment count is used for displaying a count of adjusting the execution policy of the data processing task. Based on this, after step 203, the following sub-steps are included.

1. Record an execution policy adjustment count of the data processing task.

2. Switch the execution policy of the data processing task from an adjustable status to an unadjustable status in response to that the execution policy adjustment count is equal to a count threshold.

The count threshold refers to a maximum upper limit of the execution policy adjustment count, that is, a maximum adjustment count corresponding to the execution policy adjustment count. The count threshold may be a value configured or adjusted based on experience. The adjustable status refers to a status in which the execution policy corresponding to the data processing task may be adjusted, and the unadjustable status refers to a status in which the execution policy corresponding to the data processing task cannot be adjusted.

In the embodiments of this disclosure, after adjusting the execution policy of the data processing task, the management node records an execution policy adjustment count of the data processing task. In a case that the execution policy adjustment count is equal to a count threshold, the execution policy of the data processing task is switched from an adjustable status to an unadjustable status.

After the execution policy of the data processing task is switched to the unadjustable status, in a case that there is an abnormal processing node in the remaining processing nodes in the processing node cluster, it is determined that performing of the data processing task fails, and a failure reason of the data processing task is recorded.

The execution policy adjustment count of the data processing task is limited, so as to avoid unnecessary processing overheads caused because a plurality of times of policy adjustment mechanisms are triggered by constantly failed performing of the data processing task due to irreversible causes.

Step 204. Determine data processing sub-tasks respectively corresponding to the auxiliary node and remaining processing nodes based on the execution policy.

In the embodiments of this disclosure, after determining the execution policy, the management node determines data processing sub-tasks respectively corresponding to the auxiliary node and remaining processing nodes based on the execution policy. In a possible implementation, to ensure that the data processing task can be completed within a specific time period, the management node may determine a quantity of auxiliary nodes that need to be enabled or activated (to take over abnormal node) according to a processing progress of the data processing task. Based on this, step 204 includes the following sub-steps.

1. Determine a quantity m of enabled auxiliary nodes based on the execution policy and a processing progress of the data processing task.

The processing progress of the data processing task refers to a ratio of a completed part of the data processing task and all the data processing task before there is an abnormal processing node. After determining the execution policy, the management node may obtain a processing progress of the data processing task according to a processing manner of the data processing task indicated by the execution policy, determine unprocessed parts of the data processing task according to the processing progress of the data processing task, and determine a quantity m of auxiliary nodes according to data processing efficiency of the auxiliary nodes. m is a positive integer. In one implementation, the m auxiliary nodes may take over n abnormal nodes, where n is a positive integer.

A quantity of enabled auxiliary nodes is determined according to the execution policy and the processing progress of the data processing task, to ensure the processing efficiency of the data processing task, thereby ensuring that the data processing task is successfully completed.

2. Divide unprocessed parts of the data processing task, to determine data processing sub-tasks respectively corresponding to the m auxiliary nodes and the remaining processing nodes.

In the embodiments of this disclosure, after determining the quantity of auxiliary nodes, the management node may divide unprocessed parts of the data processing task, to determine data processing sub-tasks respectively corresponding to the m auxiliary nodes and the remaining processing nodes.

A division manner of the unprocessed parts of the data processing task is similar to the division manner described in step 201. Details are not described herein again.

After determining the data processing sub-tasks, the management node may generate a new task list, and transmit the new task list to remaining auxiliary nodes other than the determined auxiliary nodes.

Step 205. Transmit corresponding task execution instructions to the auxiliary node and the remaining processing nodes.

The task execution instructions are used for instructing the auxiliary node and the remaining processing nodes to perform the corresponding data processing sub-tasks. In the embodiments of this disclosure, after determining the data processing sub-tasks, the management node transmits corresponding task execution instructions to the auxiliary node and the remaining processing nodes. Correspondingly, after receiving the task execution instructions, the auxiliary node and the remaining processing nodes perform the corresponding data processing sub-tasks.

After receiving the task execution instructions, the auxiliary node and the remaining processing nodes may alternatively transmit measurement reports to the management node periodically.

In conclusion, in the technical solutions provided in the embodiments of this disclosure, in a case that it is detected that there is an abnormal processing node in a processing node cluster corresponding to a data processing task, abnormal status information of the abnormal processing node is obtained. An execution policy of the data processing task is adjusted in a case that it is determined according to the abnormal status information that an auxiliary node is enabled, and data processing sub-tasks respectively corresponding to the auxiliary node and remaining processing nodes are determined again, the remaining processing nodes being processing nodes other than the abnormal processing node in the processing node cluster. In this way, the abnormal processing node is replaced by the auxiliary node, so that the auxiliary node and the remaining processing nodes collaboratively perform the data processing task, avoiding a failure of the data processing task caused by a processing node abnormal, thereby improving the reliability of data processing, and ensuring that the data processing task can be successfully completed. Moreover, low data processing efficiency caused by unreasonable allocation of the data processing task may be avoided in this method, which is beneficial to improve the data processing efficiency of each node, thereby ensuring the processing efficiency of the entire data processing task.

An adjustment manner of the execution policy of the data processing task is described below.

In a possible implementation, the management node determines the execution policy according to a quantity of abnormal processing nodes. For example, after determining to enable the auxiliary node, the management node obtains a quantity of abnormal processing nodes, and determines, in a case that the quantity of abnormal processing nodes is greater than a quantity threshold, to execute a task re-division policy. In this case, the execution policy includes the task re-division policy, the task re-division policy being a policy of re-dividing unprocessed parts of the data processing task. After determining the task re-division policy, the management node performs re-division on the unprocessed parts of the data processing task, to determine data processing sub-tasks respectively corresponding to the auxiliary node and the remaining processing nodes.

In another possible implementation, the management node determines the execution policy according to a task processing progress of a data processing sub-task of the abnormal processing node. For example, after determining to enable the auxiliary node, the management node transmits a progress query request to the abnormal processing node, the progress query request being used for requesting to obtain a task processing progress of the abnormal processing node, and determines, in a case that a data loss response from the abnormal processing node is received, to execute a secondary computing policy, the data loss response being used for indicating that processed data of a data processing sub-task corresponding to the abnormal processing node is lost. In this case, the execution policy includes the secondary computing policy, the secondary computing policy being a policy in which the auxiliary node re-performs the data processing sub-task corresponding to the abnormal processing node. After determining the secondary computing policy, the management node performs re-division on the unprocessed parts of the data processing sub-task of the abnormal processing node, to determine a data processing sub-task corresponding to the auxiliary node. In a case that the processed data of the data processing sub-task corresponding to the abnormal processing node is not lost, the management node may alternatively determine an execution policy in which the auxiliary node performs unprocessed parts of the data processing sub-task corresponding to the abnormal processing node. The auxiliary node may re-use the data already processed by the abnormal processing node.

Figure 3:
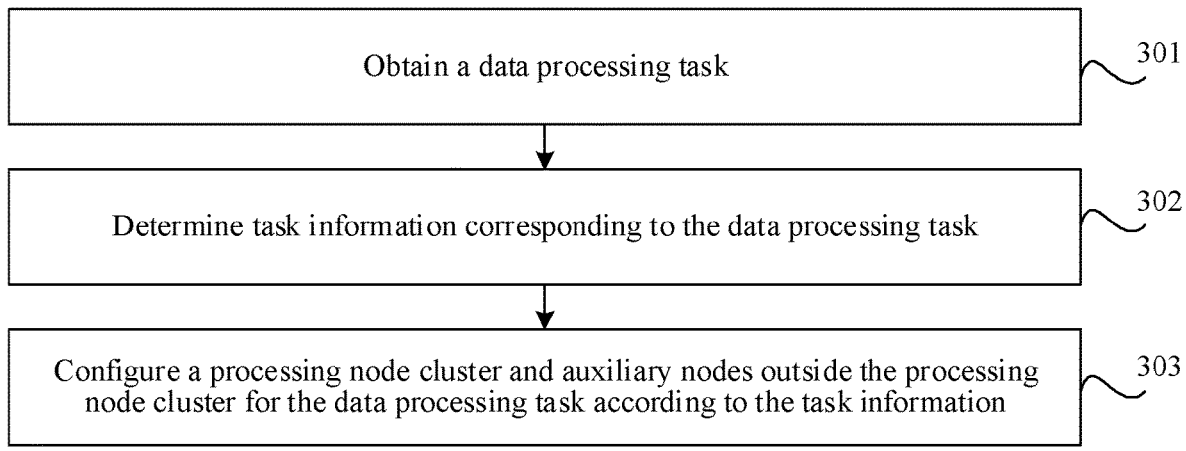
FIG. 3 is a flowchart of a processing node configuration method according to an embodiment of this disclosure.

FIG. 3 is a flowchart of a processing node configuration method according to an embodiment of this disclosure. An execution subject of each step may be a computer device, and the computer device is, for example, the policy control node 10 in the data processing system in FIG. 1. The method may include the following steps (step 301 to step 303):

Step 301. Obtain a data processing task.

The data processing task refers to a task of processing a part of data, for example, performing data traversing, data storage, data conversion, and data visualization. The data processing task may be a task of processing data of all types, or may be a task of processing big data. This is not limited in the embodiments of this disclosure.

In the embodiments of this disclosure, the policy control node may obtain a data processing task from a storage list of data processing tasks. The storage list is used for storing various data processing tasks, to avoid overloading of the policy control node due to receipt of too much data processing tasks.

Step 302. Determine task information corresponding to the data processing task.

The task information is related information about a data processing situation during performing of the data processing task. The policy control node may configure corresponding processing nodes and auxiliary nodes for the data processing task according to the task information. In the embodiments of this disclosure, after obtaining the data processing task, the policy control node may analyze the data processing task, to determine task information corresponding to the data processing task.

Step 303. Configure a processing node cluster and auxiliary nodes outside the processing node cluster for the data processing task according to the task information.

The processing node cluster refers to a node cluster including a plurality of processing nodes. In the embodiments of this disclosure, the plurality of processing nodes are configured to collaboratively perform the foregoing data processing task. The auxiliary node is configured to perform, in a case that there is an abnormal processing node in the processing node cluster, the task in replace of the abnormal processing node. That is, the processing node cluster is a set formed by a plurality of processing nodes configured for the data processing task. The plurality of processing nodes are configured to collaboratively process the data processing task, and each processing node in the processing node cluster performs a part of tasks (that is, a data processing sub-task) in the data processing task. The auxiliary nodes are nodes additionally configured outside the processing node cluster. The additionally configured nodes have the same or similar processing capabilities of the processing nodes, and can replace, in a case that there is an abnormal in the processing nodes, the processing nodes to perform tasks. There may be one or more configured auxiliary nodes. This is not limited in this embodiment.

In a possible implementation, the task information may include a parallel computing acceleration ratio, task processing duration, and a to-be-processed data volume. The parallel computing acceleration ratio is used for representing parallel computing efficiency of the data processing task. The task processing duration refers to duration required in a case that the data processing task is completed. The task processing duration may be expected duration of computing of the policy control node, or may be required duration corresponding to the data processing task. This is not limited in the embodiments of this disclosure. The to-be-processed data volume refers to a data volume that needs to be processed and that corresponds to the data processing task.

In the embodiments of this disclosure, the policy control node may determine quantities of processing nodes and auxiliary nodes according to the parallel computing acceleration ratio, the task processing duration, and the to-be-processed data volume. For example, after obtaining the task information, the policy control node may determine a quantity of processing nodes according to the task processing duration and the to-be-processed data volume, to ensure that the data processing task can be successfully completed within the task processing duration. Then, in a case that the parallel computing acceleration ratio reaches an upper limit, the policy control node determines a ratio of the processing nodes and the auxiliary nodes, to ensure optimal processing efficiency of the data processing task. The upper limit may be a maximum value of the parallel computing acceleration ratio, or may be a value set by a designer based on actual experience. This is not limited in the embodiments of this disclosure. After that, the policy control node determines a quantity of auxiliary nodes according to the ratio of the processing nodes and the auxiliary nodes and the quantity of the processing nodes.

In the embodiments of this disclosure, the policy control node may further determine a quantity of management nodes. After determining the quantity of the processing nodes, the policy control node obtains a maximum management quantity of management nodes, the maximum management quantity being a maximum quantity of processing nodes that is capable of being managed by a single management node. Then, the policy control node determines the quantity of management nodes according to the maximum management quantity and the quantity of processing nodes. The quantity of management nodes and the quantity of processing nodes satisfy that the management node does not need to wait for a long time during management of each processing node.

After determining the quantities of the management nodes, the processing nodes, and the auxiliary nodes, the policy control node transmits data processing information to the management nodes. The data processing information includes the foregoing data processing task and the quantities of the management nodes, the processing nodes, and the auxiliary nodes that correspond to the data processing task.

In another possible implementation, the policy control node may alternatively determine specific processing nodes or auxiliary nodes according to a data processing type of the data processing task. For example, if the data processing task is data visualization, the policy control node selects processing nodes and auxiliary nodes with high data visualization efficiency, and transmits identifiers of the processing nodes and the auxiliary nodes to the management node.

In conclusion, in the technical solutions provided in the embodiments of this disclosure, quantities of all types of nodes are determined by using task information corresponding to a data processing task, that is, different quantities of nodes are configured for different data processing tasks, to avoid time-consuming data processing tasks caused by too few nodes or waste of resources caused by too many nodes, thereby reducing unnecessary waste of resources while ensuring the reliability of the data processing task.

The above description of each step is only exemplary and explanatory. In practical application, the execution subject of each step may be different from the description in this application. For example, the management node may perform the processing node configuration method corresponding to the policy control node. Alternatively, division of the data processing task may be performed by using other nodes. This is not limited in the embodiments of this disclosure.

The following describes apparatus embodiments of this disclosure, which can be used for executing the method embodiments of this disclosure. For details not disclosed in the apparatus embodiments of this disclosure, refer to the method embodiments of this disclosure.

Figure 4:
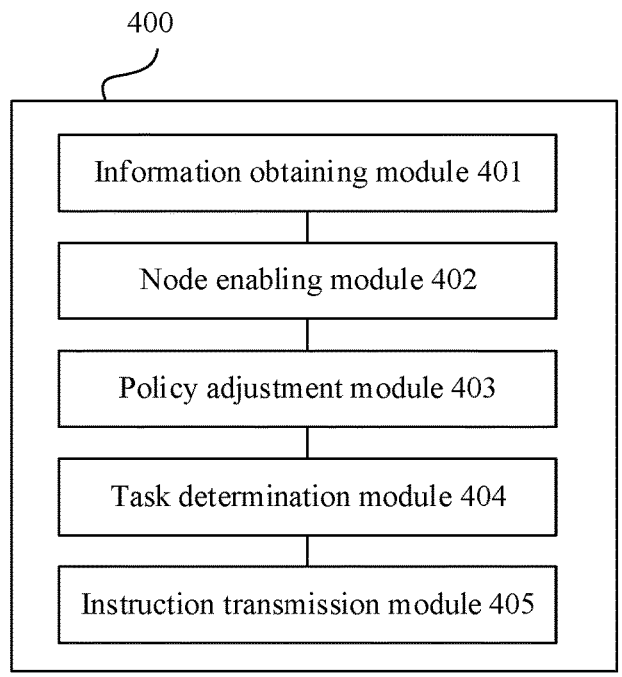
FIG. 4 is a block diagram of a processing node management apparatus according to an embodiment of this disclosure.

FIG. 4 is a block diagram of a processing node management apparatus according to an embodiment of this disclosure. The apparatus has functions of implementing the foregoing processing node management method. The functions may be implemented by hardware, or may be implemented by hardware executing corresponding software. The apparatus may be a computer device, or may be disposed on the computer device. The apparatus 400 may include: an information obtaining module 401, a node enabling module 402, a policy adjustment module 403, a task determination module 404, and an instruction transmission module 405.

The information obtaining module 401 is configured to obtain, in a case that it is detected that there is an abnormal processing node in a processing node cluster corresponding to a data processing task, abnormal status information of the abnormal processing node, the processing node cluster including a plurality of processing nodes, the plurality of processing nodes being configured to collaboratively perform the data processing task.

The node enabling module 402 is configured to determine, in a case that the abnormal status information satisfies a condition, to enable an auxiliary node outside the processing node cluster to replace the abnormal processing node.

The policy adjustment module 403 is configured to adjust an execution policy of the data processing task in a case that it is determined that the auxiliary node is enabled, the execution policy being used for indicating a processing manner of the data processing task.

The task determination module 404 is configured to determine data processing sub-tasks respectively corresponding to the auxiliary node and remaining processing nodes based on the execution policy, the remaining processing nodes being processing nodes other than the abnormal processing node in the processing node cluster.

The instruction transmission module 405 is configured to transmit corresponding task execution instructions to the auxiliary node and the remaining processing nodes, the task execution instructions being used for instructing the auxiliary node and the remaining processing nodes to perform the corresponding data processing sub-tasks.

In an exemplary embodiment, the policy adjustment module 403 is configured to obtain a quantity of abnormal processing nodes; and determine, in a case that the quantity of abnormal processing nodes is greater than a quantity threshold, to execute a task re-division policy, the execution policy including the task re-division policy, the task re-division policy being a policy of re-dividing unprocessed parts of the data processing task.

In an exemplary embodiment, the policy adjustment module 403 is configured to transmit a progress query request to the abnormal processing node, the progress query request being used for requesting to obtain a task processing progress of the abnormal processing node; and determine, in a case that a data loss response from the abnormal processing node is received, to execute a secondary computing policy, the data loss response being used for indicating that processed data of a data processing sub-task corresponding to the abnormal processing node is lost, the execution policy including the secondary computing policy, the secondary computing policy being a policy in which the auxiliary node re-performs the data processing sub-task corresponding to the abnormal processing node.

In an exemplary embodiment, the task determination module 404 is configured to determine a quantity m of enabled auxiliary nodes based on the execution policy and a processing progress of the data processing task, m being a positive integer; and divide unprocessed parts of the data processing task, to determine data processing sub-tasks respectively corresponding to the m auxiliary nodes and the remaining processing nodes.

Figure 5:
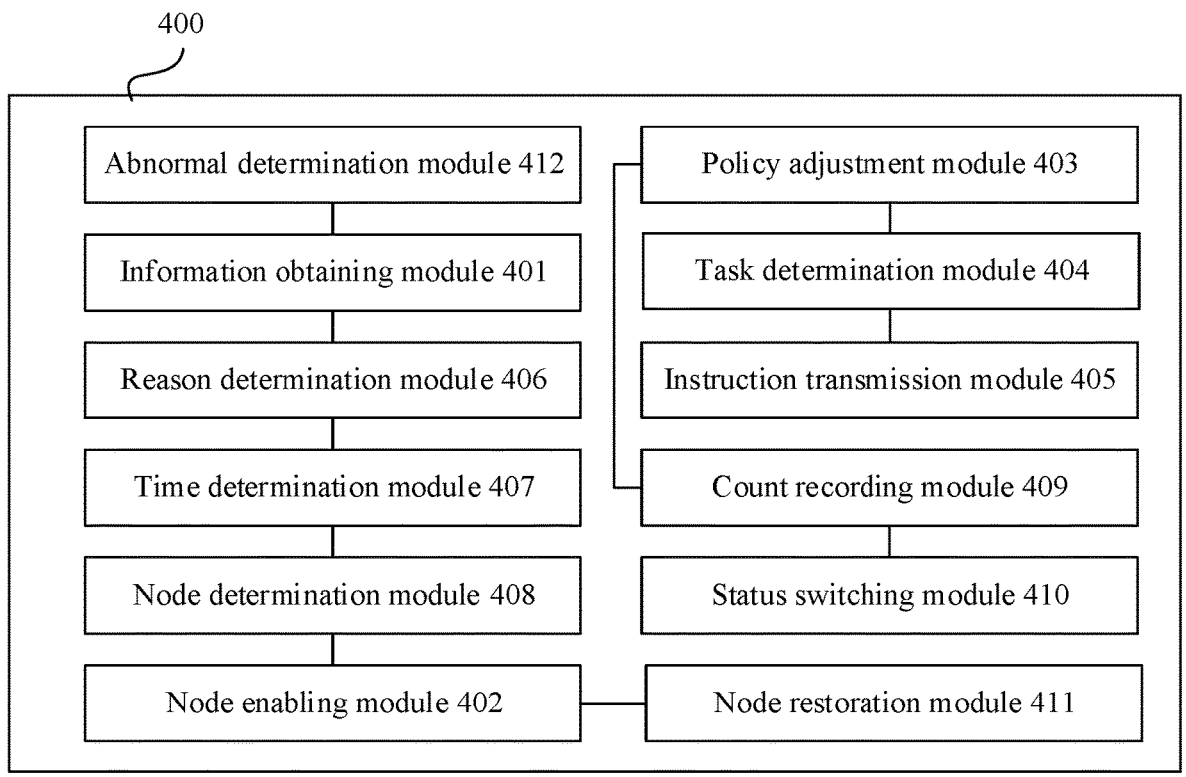
FIG. 5 is a block diagram of a processing node management apparatus according to another embodiment of this disclosure.

In an exemplary embodiment, as shown in FIG. 5, the apparatus 400 further includes: a reason determination module 406, a time determination module 407, and a node determination module 408.

The reason determination module 406 is configured to determine an abnormal reason of the abnormal processing node according to the abnormal status information.

The time determination module 407 is configured to determine a restoration time of the abnormal processing node according to the abnormal reason.

The node determination module 408 is configured to determine, in a case that the restoration time is greater than a threshold, to enable the auxiliary node to replace the abnormal processing node.

In an exemplary embodiment, as shown in FIG. 5, the apparatus 400 further includes: a count recording module 409 and a status switching module 410.

The count recording module 409 is configured to record an execution policy adjustment count of the data processing task.

The status switching module 410 is configured to switch the execution policy of the data processing task from an adjustable status to an unadjustable status in response to that the execution policy adjustment count is equal to a count threshold.

In an exemplary embodiment, as shown in FIG. 5, the apparatus 400 further includes: a node restoration module 411.

The node restoration module 411 is configured to transmit a restoration instruction to the abnormal processing node, the restoration instruction including restoration data used for restoring the abnormal processing node; determine, in a case that a restoration completion response from the abnormal processing node is received, that the abnormal processing node is restored from an abnormal status to a normal status; transmit configuration information to the abnormal processing node, the configuration information being used for configuring the abnormal processing node as the auxiliary node; and determine, in a case that a configuration completion response from the abnormal processing node is received, that the abnormal processing node is replaced with the auxiliary node.

In an exemplary embodiment, as shown in FIG. 5, the apparatus 400 further includes: an abnormal determination module 412.

The abnormal determination module 412 is configured to obtain a measurement report transmitted by each processing node in the processing node cluster, the measurement report including task processing information and node status information, the task processing information being used for indicating a task processing progress of the each processing node, and the node status information being used for indicating a working status of the each processing node; and determine, in a case that there is an abnormal in a measurement report of a target processing node, that the target processing node is the abnormal processing node, that there is an abnormal in a measurement report including at least one of the following: there is an abnormal in task processing information included in the measurement report, there is an abnormal in node status information included in the measurement report, and the measurement report is not received within set duration.

In conclusion, in the technical solutions provided in the embodiments of this disclosure, in a case that it is detected that there is an abnormal processing node in a processing node cluster corresponding to a data processing task, abnormal status information of the abnormal processing node is obtained. An execution policy of the data processing task is adjusted in a case that it is determined according to the abnormal status information that an auxiliary node is enabled, and data processing sub-tasks respectively corresponding to the auxiliary node and remaining processing nodes are determined again, the remaining processing nodes being processing nodes other than the abnormal processing node in the processing node cluster. In this way, the abnormal processing node is replaced by the auxiliary node, so that the auxiliary node and the remaining processing nodes collaboratively perform the data processing task, avoiding a failure of the data processing task caused by a processing node abnormal, thereby improving the reliability of data processing, and ensuring that the data processing task can be successfully completed. Moreover, low data processing efficiency caused by unreasonable allocation of the data processing task may be avoided in this method, which is beneficial to improve the data processing efficiency of each node, thereby ensuring the processing efficiency of the entire data processing task.

Figure 6:
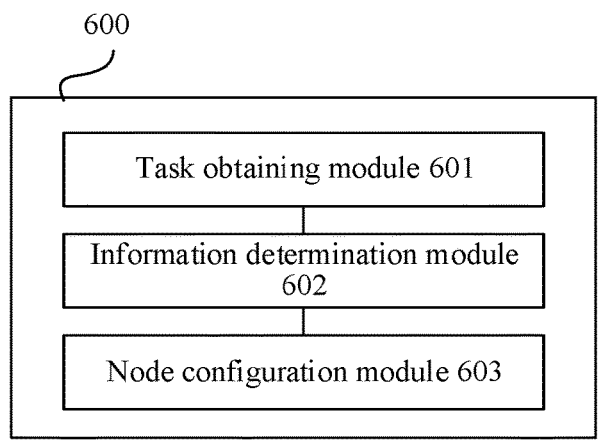
FIG. 6 is a block diagram of a processing node configuration apparatus according to an embodiment of this disclosure.

FIG. 6 is a block diagram of a processing node configuration apparatus according to an embodiment of this disclosure. The apparatus has functions of implementing the foregoing processing node configuration method. The functions may be implemented by hardware, or may be implemented by hardware executing corresponding software. The apparatus may be a computer device, or may be disposed on the computer device. The apparatus 600 may include: a task obtaining module 601, an information determination module 602, and a node configuration module 603.

The task obtaining module 601 is configured to obtain a data processing task.

The information determination module 602 is configured to determine task information corresponding to the data processing task, the task information being related information about a data processing situation during performing of the data processing task.

The node configuration module 603 is configured to configure a processing node cluster and auxiliary nodes outside the processing node cluster for the data processing task according to the task information.

The processing node cluster includes a plurality of processing nodes, the plurality of processing nodes being configured to collaboratively perform the data processing task, and the auxiliary node is configured to perform, in a case that there is an abnormal processing node in the processing node cluster, the task in replace of the abnormal processing node.

In an exemplary embodiment, the task information includes a parallel computing acceleration ratio, task processing duration, and a to-be-processed data volume. The node configuration module 603 is configured to determine a quantity of processing nodes according to the task processing duration and the to-be-processed data volume; determine a ratio of the processing nodes and the auxiliary nodes in a case that the parallel computing acceleration ratio reaches an upper limit; and determine a quantity of the auxiliary nodes according to the ratio of the processing nodes and the auxiliary nodes and the quantity of the processing nodes.

Figure 7:
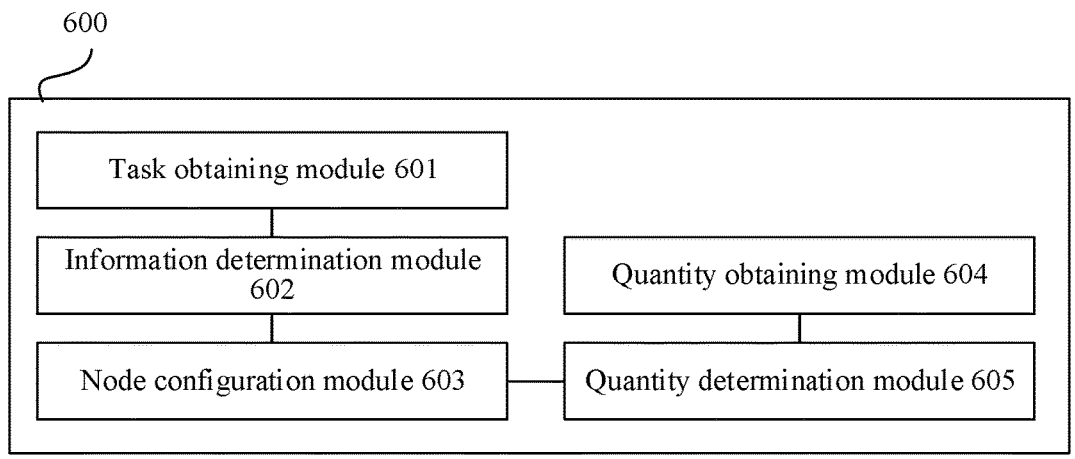
FIG. 7 is a block diagram of a processing node configuration apparatus according to another embodiment of this disclosure.

In an exemplary embodiment, as shown in FIG. 7, the apparatus 600 further includes: a quantity obtaining module 604 and a quantity determination module 605.

The quantity obtaining module 604 is configured to obtain a maximum management quantity of management nodes, the maximum management quantity being a maximum quantity of processing nodes that is capable of being managed by a single management node.

The quantity determination module 605 is configured to determine a quantity of the management nodes according to the maximum management quantity and the quantity of the processing nodes.

In conclusion, in the technical solutions provided in the embodiments of this disclosure, in a case that it is detected that there is an abnormal processing node in a processing node cluster corresponding to a data processing task, abnormal status information of the abnormal processing node is obtained. An execution policy of the data processing task is adjusted in a case that it is determined according to the abnormal status information that an auxiliary node is enabled, and data processing sub-tasks respectively corresponding to the auxiliary node and remaining processing nodes are determined again, the remaining processing nodes being processing nodes other than the abnormal processing node in the processing node cluster. In this way, the abnormal processing node is replaced by the auxiliary node, so that the auxiliary node and the remaining processing nodes collaboratively perform the data processing task, avoiding a failure of the data processing task caused by a processing node abnormal, thereby improving the reliability of data processing, and ensuring that the data processing task can be successfully completed. Moreover, low data processing efficiency caused by unreasonable allocation of the data processing task may be avoided in this method, which is beneficial to improve the data processing efficiency of each node, thereby ensuring the processing efficiency of the entire data processing task.

When the apparatus provided in the foregoing embodiments implements functions of the apparatus, the division of the foregoing functional modules is merely an example for description. In practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

Figure 8:
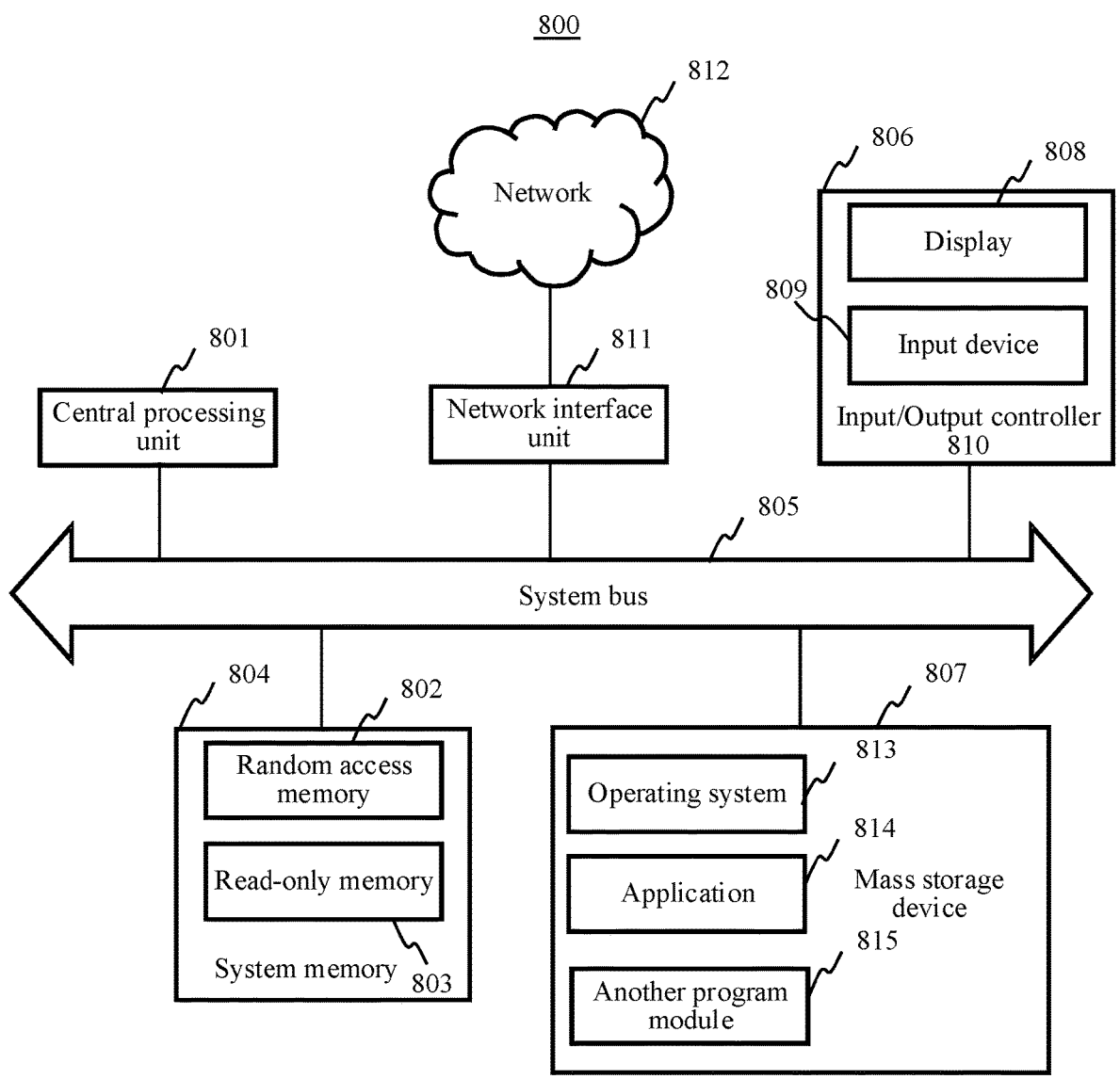
FIG. 8 is a structural block diagram of a computer device according to an embodiment of this disclosure.

FIG. 8 is a schematic block diagram of a computer device according to an embodiment of this disclosure. In this disclosure, a unit and a module may be hardware such as a combination of electronic circuitries; firmware; or software such as computer instructions. The unit and the module may also be any combination of hardware, firmware, and software. In some implementation, a unit may include at least one module. The computer device may be configured to implement functions of the processing node management method or the processing node configuration method. Specifically:

the computer device 800 includes a central processing unit (CPU) 801, a system memory 804 including a random access memory (RAM) 802 and a read-only memory (ROM) 803, and a system bus 805 connecting the system memory 804 to the CPU 801. The computer device 800 further includes a basic input/output (I/O) system 806 assisting in transmitting information between components in the computer, and a mass storage device 807 configured to store an operating system 813, an application program 814, and another program module 812.

The basic I/O system 806 includes a display 808 configured to display information and an input device 809 such as a mouse or a keyboard that is used for inputting information by a user. The display 808 and the input device 809 are both connected to the CPU 801 by using an input/output controller 88 connected to the system bus 805. The basic I/O system 806 may further include the input and output controller 810 to be configured to receive and process inputs from a plurality of other devices such as a keyboard, a mouse, and an electronic stylus. Similarly, the input/output controller 810 further provides an output to a display screen, a printer, or another type of output device.

The mass storage device 807 is connected to the CPU 801 by using a mass storage controller (not shown) connected to the system bus 805. The mass storage device 807 and a computer-readable medium associated with the large-capacity storage device provide non-volatile storage to the computer device 800. That is, the mass storage device 807 may include a computer-readable medium (not shown) such as a hard disk or a compact disc ROM (CD-ROM) drive.

Generally, the computer-readable medium may include a computer storage medium and a communication medium. The computer storage medium includes volatile and non-transitory media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art can know that the computer storage medium is not limited to the foregoing several types. The system memory 804 and the mass storage device 807 may be collectively referred to as a memory.

According to the embodiments of this disclosure, the computer device 800 may further be connected, through a network such as the Internet, to a remote computer on the network and run. That is, the computer device 800 may be connected to a network 812 by using a network interface unit 811 connected to the system bus 805, or may be connected to another type of network or a remote computer system (not shown) by using a network interface unit 811.

The memory further includes computer programs. The computer programs are stored in the memory and configured to be executed by one or more processors, to implement the processing node management method or the processing node configuration method.

In an exemplary embodiment, a non-transitory computer-readable storage medium is further provided, including at least one instruction, at least one segment of program, a code set or an instruction set, the at least one instruction, the at least one segment of program, the code set or the instruction set being loaded and executed by a processor to implement the foregoing processing node management method or the foregoing processing node configuration method.

Optionally, the non-transitory computer-readable storage medium may include: a ROM, a RAM, a solid state drive (SSD), an optical disc, or the like. The RAM may include a resistance random access memory (ReRAM) and a dynamic random access memory (DRAM).

In an exemplary embodiment, a computer program product or a computer program is provided. The computer program product or the computer program includes computer instructions, and the computer instructions are stored in a non-transitory computer-readable storage medium. A processor of a computer device reads the computer instructions from the non-transitory computer-readable storage medium, and executes the computer instructions to cause the computer device to perform the foregoing processing node management method or the foregoing processing node configuration method.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this disclosure.

The foregoing descriptions are merely exemplary embodiments of this disclosure, but are not intended to limit this application. Any modification, equivalent replacement, or improvement made within the spirit and principle of this application shall fall within the protection scope of this application.

What is claimed is:

1. A method for node management, performed by a computer device, the method comprising:
    obtaining, in response to an abnormal processing node in a processing node cluster being detected, abnormal status information of the abnormal processing node, wherein the processing node cluster comprises a plurality of processing nodes and is associated with a data processing task, and the plurality of processing nodes are configured to collaboratively perform the data processing task;
    in response to the abnormal status information satisfying a condition, enabling an auxiliary node outside the processing node cluster to replace the abnormal processing node;
    in response to enabling the auxiliary node, adjusting an execution policy of the data processing task, the execution policy being used for indicating a processing manner of the data processing task and comprising a secondary computing policy, the secondary computing policy being a policy in which the auxiliary node re-performs a data processing sub-task with lost processed data reported by the abnormal processing node;
    distributing data processing sub-tasks to the auxiliary node and remaining processing nodes based on the execution policy, the remaining processing nodes being processing nodes in the processing node cluster other than the abnormal processing node; and
    transmitting task execution instructions to the auxiliary node and the remaining processing nodes, the task execution instructions being used for instructing the auxiliary node and the remaining processing nodes to perform the corresponding data processing sub-tasks.

2. The method according to claim 1, wherein:
    the execution policy comprises a task re-distribute policy, the task re-distribute policy being a policy of re-distributing unprocessed parts of the data processing task; and adjusting the execution policy of the data processing task comprises:
  obtaining a quantity of abnormal processing nodes; and
  in response to the quantity of abnormal processing nodes being greater than a quantity threshold, executing the task re-distribute policy.

3. The method according to claim 1, wherein:
adjusting an execution policy of the data processing task comprises:
  transmitting, to the abnormal processing node, a progress query request for requesting a task processing progress of the abnormal processing node; and
  in response to a data loss response from the abnormal processing node being received, executing the secondary computing policy, the data loss response indicating that processed data of the data processing sub-task corresponding to the abnormal processing node is lost.

4. The method according to claim 1, wherein distributing the data processing sub-tasks to the auxiliary node and remaining processing nodes based on the execution policy comprises:
  determining a quantity m of enabled auxiliary nodes based on the execution policy and a processing progress of the data processing task, m being a positive integer; and
  dividing unprocessed parts of the data processing task, to determine data processing sub-tasks respectively corresponding to the m auxiliary nodes and the remaining processing nodes.

5. The method according to claim 1, wherein, in response to the abnormal status information satisfying the condition, enabling the auxiliary node outside the processing node cluster to replace the abnormal processing node comprises:
  determining an abnormal reason of the abnormal processing node according to the abnormal status information;
  determining a restoration time duration of the abnormal processing node according to the abnormal reason; and
  in response to the restoration time duration being greater than a threshold, enabling the auxiliary node to replace the abnormal processing node.

6. The method according to claim 1, wherein after adjusting the execution policy of the data processing task, the method further comprises:
  recording an execution policy adjustment count of the data processing task; and
  switching the execution policy of the data processing task from an adjustable status to an unadjustable status in response to the execution policy adjustment count being equal to a count threshold.

7. The method according to claim 1, wherein after enabling the auxiliary node outside the processing node cluster to replace the abnormal processing node, the method further comprises:
  transmitting, to the abnormal processing node, a restoration instruction comprising restoration data used for restoring the abnormal processing node;
  determining, in response to a restoration completion response from the abnormal processing node being received, that the abnormal processing node is restored from an abnormal status to a normal status;
  transmitting configuration information to the abnormal processing node, the configuration information being used for configuring the abnormal processing node as the auxiliary node; and
  determining, in response to a configuration completion response from the abnormal processing node being received, that the abnormal processing node is replaced with the auxiliary node.

8. The method according to claim 1, wherein before obtaining the abnormal status information of the abnormal processing node, the method further comprises:
  receiving, from each processing node in the processing node cluster, a measurement report associated with the each processing node, the measurement report comprising task processing information and node status information, the task processing information indicating a task processing progress of the each processing node, and the node status information indicating a working status of the each processing node; and
  determining, in response to an abnormal condition being detected in the measurement report associated with a target processing node, that the target processing node is the abnormal processing node,
  wherein the abnormal condition comprises at least one of the following:
    a first abnormal condition indicated by the task processing information;
    a second abnormal condition indicate by the node status information; or
    the measurement report being not received within a predetermined duration.

9. A method for node configuration, performed by a computer device, the method comprising:
  obtaining a data processing task;
  determining task information corresponding to the data processing task, the task information comprising a task processing duration and a to-be-processed data volume; and
  configuring a processing node cluster and auxiliary nodes outside the processing node cluster for the data processing task according to the task processing duration and the to-be-processed data volume in the task information, wherein: the processing node cluster comprises a plurality of processing nodes; the plurality of processing nodes are configured to collaboratively perform the data processing task; and the auxiliary node is configured to take over tasks of an abnormal processing node in the processing node cluster.

10. The method according to claim 9, wherein:
the task information further comprises a parallel computing acceleration ratio; and
configuring the processing node cluster and the auxiliary nodes outside the processing node cluster for the data processing task comprises:
  configuring a quantity of processing nodes according to the task processing duration and the to-be-processed data volume;
  determining a node ratio of the processing nodes and the auxiliary nodes in response to the parallel computing acceleration ratio reaching an upper limit; and
  configuring a quantity of the auxiliary nodes according to the node ratio.

11. The method according to claim 9, further comprising:
  obtaining a maximum management quantity of management nodes, the maximum management quantity being a maximum quantity of processing nodes that is capable of being managed by a single management node; and
  determining a quantity of the management nodes according to the maximum management quantity and a quantity of the processing nodes.

12. A device comprising a non-transitory computer-readable storage medium for storing computer instructions and a processor in communication with the memory, wherein, when the processor executes the computer instructions, the processor is configured to cause the device to:

obtain, in response to an abnormal processing node in a processing node cluster being detected, abnormal status information of the abnormal processing node, wherein the processing node cluster comprises a plurality of processing nodes and is associated with a data processing task, and the plurality of processing nodes are configured to collaboratively perform the data processing task;

in response to the abnormal status information satisfying a condition, enable an auxiliary node outside the processing node cluster to replace the abnormal processing node;

in response to enabling the auxiliary node, adjust an execution policy of the data processing task, the execution policy being used for indicating a processing manner of the data processing task and comprising a secondary computing policy, the secondary computing policy being a policy in which the auxiliary node re-performs a data processing sub-task with lost processed data in the abnormal processing node;

distribute data processing sub-tasks to the auxiliary node and remaining processing nodes based on the execution policy, the remaining processing nodes being processing nodes in the processing node cluster other than the abnormal processing node; and transmit task execution instructions to the auxiliary node and the remaining processing nodes, the task execution instructions being used for instructing the auxiliary node and the remaining processing nodes to perform the corresponding data processing sub-tasks.

13. The device according to claim 12, wherein:

the execution policy comprises a task re-distribute policy, the task re-distribute policy being a policy of re-distributing unprocessed parts of the data processing task; and when the processor is configured to cause the device to adjust the execution policy of the data processing task, the processor is configured to cause the device to:
obtain a quantity of abnormal processing nodes; and
in response to the quantity of abnormal processing nodes being greater than a quantity threshold, execute the task re-distribute policy.

14. The device according to claim 12, wherein:

when the processor is configured to cause the device to adjust an execution policy of the data processing task, the processor is configured to cause the device to:
transmitting, to the abnormal processing node, a progress query request for requesting a task processing progress of the abnormal processing node; and
in response to a data loss response from the abnormal processing node being received, executing the secondary computing policy, the data loss response indicating that processed data of the data processing sub-task corresponding to the abnormal processing node is lost.

15. The device according to claim 12, wherein distributing the data processing sub-tasks to the auxiliary node and remaining processing nodes based on the execution policy comprises:

determining a quantity m of enabled auxiliary nodes based on the execution policy and a processing progress of the data processing task, m being a positive integer; and dividing unprocessed parts of the data processing task, to determine data processing sub-tasks respectively corresponding to the m auxiliary nodes and the remaining processing nodes.

16. The device according to claim 12, wherein, when the processor is configured to cause the device to enable the auxiliary node outside the processing node cluster to replace the abnormal processing node, the processor is configured to cause the device to:

determine an abnormal reason of the abnormal processing node according to the abnormal status information;

determine a restoration time duration of the abnormal processing node according to the abnormal reason; and in response to the restoration time duration being greater than a threshold, enable the auxiliary node to replace the abnormal processing node.

17. The device according to claim 12, wherein, after the processor is configured to cause the device to adjust the execution policy of the data processing task, the processor is configured to further cause the device to:

record an execution policy adjustment count of the data processing task; and switch the execution policy of the data processing task from an adjustable status to an unadjustable status in response to the execution policy adjustment count being equal to a count threshold.

18. The device according to claim 12, wherein, after the processor is configured to cause the device to enable the auxiliary node outside the processing node cluster to replace the abnormal processing node, the processor is configured to further cause the device to:

transmit, to the abnormal processing node, a restoration instruction comprising restoration data used for restoring the abnormal processing node;

determine, in response to a restoration completion response from the abnormal processing node being received, that the abnormal processing node is restored from an abnormal status to a normal status;

transmit configuration information to the abnormal processing node, the configuration information being used for configuring the abnormal processing node as the auxiliary node; and determine, in response to a configuration completion response from the abnormal processing node being received, that the abnormal processing node is replaced with the auxiliary node.

19. The device according to claim 12, wherein, before the processor is configured to cause the device to obtain the abnormal status information of the abnormal processing node, the processor is configured to further cause the device to:

receive, from each processing node in the processing node cluster, a measurement report associated with the each processing node, the measurement report comprising task processing information and node status information, the task processing information indicating a task processing progress of the each processing node, and the node status information indicating a working status of the each processing node.

20. The device according to claim 19, wherein the processor is configured to further cause the device to:

determine, in response to an abnormal condition being detected in the measurement report associated with a target processing node, that the target processing node is the abnormal processing node,
wherein the abnormal condition comprises at least one of the following:
a first abnormal condition indicated by the task processing information;
a second abnormal condition indicate by the node status information; or
the measurement report being not received within a predetermined duration.

* * * * *